Figure 1:
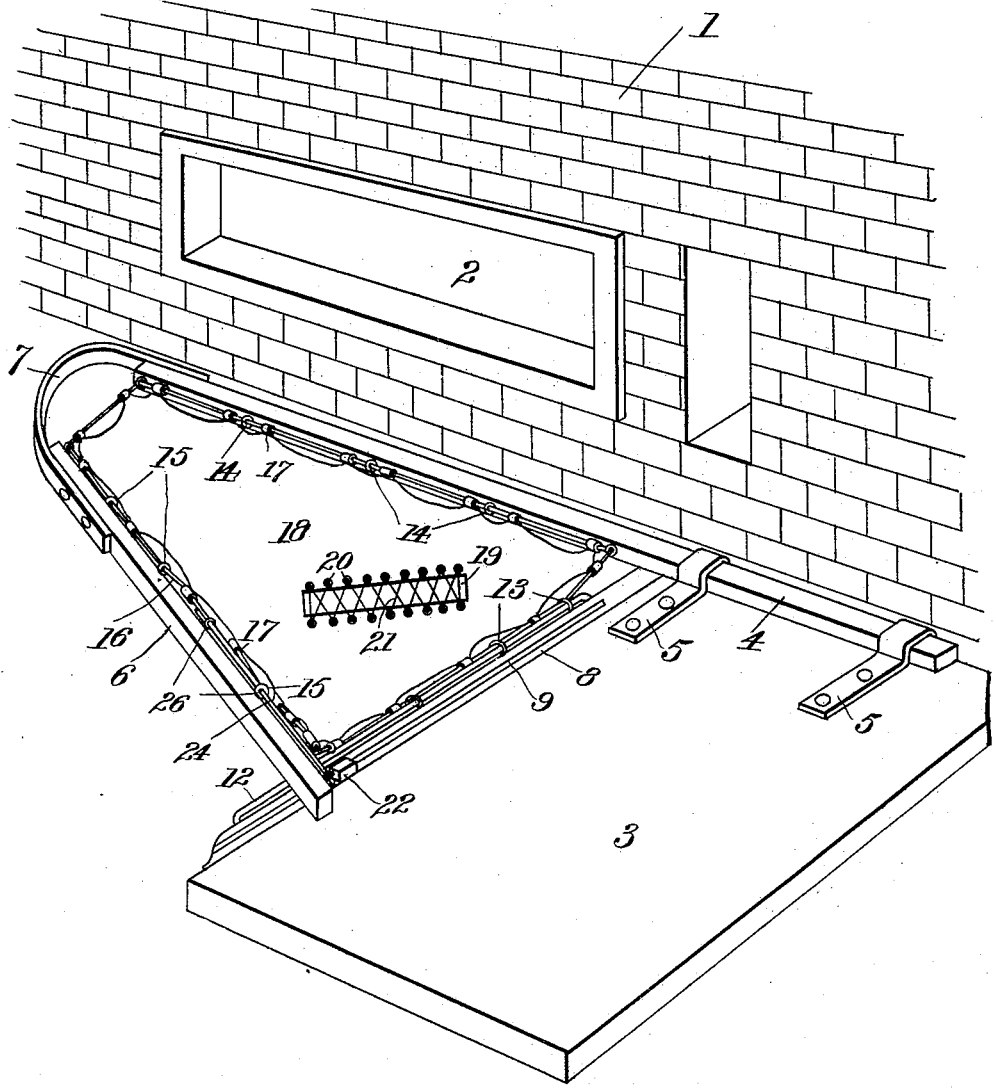

G. MUELLER.
BREAD OR OTHER COMMODITY CATCHING DEVICE.
APPLICATION FILED MAY 28, 1910.

977,213.

Patented Nov. 29, 1910.
2 SHEETS—SHEET 1.

Witnesses

Inventor
George Mueller
By
Attorney

G. MUELLER.
BREAD OR OTHER COMMODITY CATCHING DEVICE.
APPLICATION FILED MAY 28, 1910.
977,213.
Patented Nov. 29, 1910.
2 SHEETS—SHEET 2.
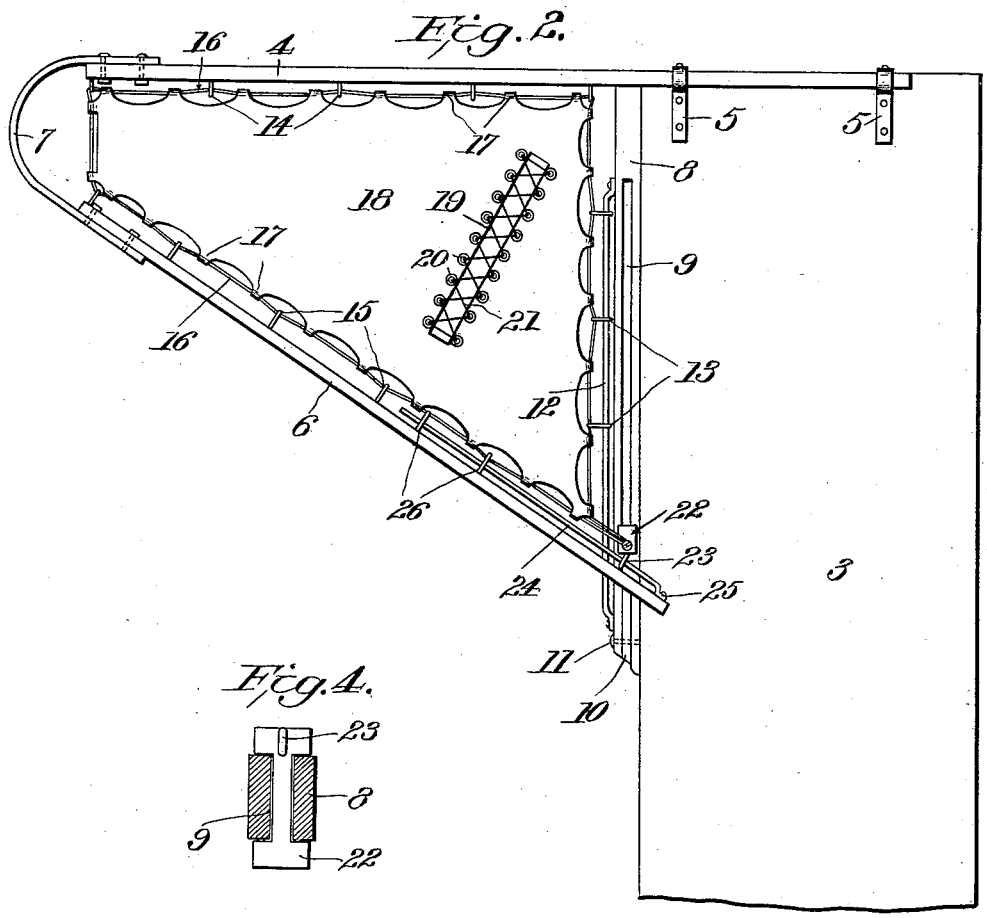
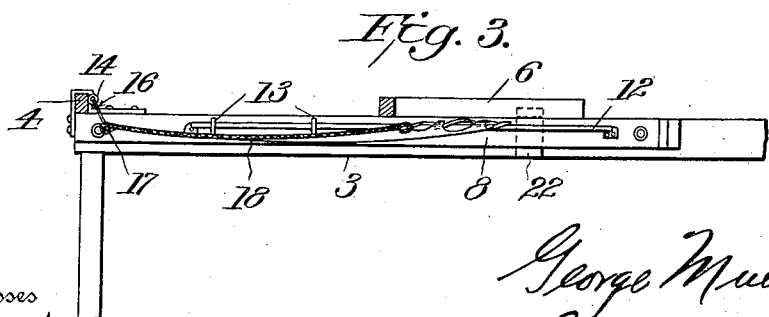

UNITED STATES PATENT OFFICE.

GEORGE MUELLER, OF SALT LAKE CITY, UTAH.

BREAD OR OTHER COMMODITY CATCHING DEVICE.

977,213.

Specification of Letters Patent. Patented Nov. 29, 1910.

Application filed May 28, 1910. Serial No. 563,982.

*To all whom it may concern:*

Be it known that I, GEORGE MUELLER, a citizen of the United States, residing at Salt Lake City, in the county of Salt Lake and State of Utah, have invented certain new and useful Improvements in Bread or other Commodity Catching Devices, of which the following is a specification.

This invention relates to bread or other commodity catching devices.

One object is to provide a device particularly adapted for association with an oven to catch bread, rolls or other commodities that may fall during removal thereof from the oven.

Another object is to provide a device of the nature stated embodying such characteristics that bread, rolls or other commodities may be economically and expeditiously removed from ovens without danger of injuring the goods or otherwise rendering the same unsalable.

With the above and other objects in view the present invention consists in the combination and arrangement of parts illustrated in the accompanying drawings, described in the specification and particularly pointed out in the appended claims, it being understood that changes may be made in the form, proportion, size and minor details without departing from the spirit of the invention or sacrificing any of the advantages thereof.

In the drawings:—Figure 1 is a perspective view showing the invention associated with an oven. Fig. 2 is a top plan view. Fig. 3 is a fragmentary sectional view. Fig. 4 is a detail sectional view showing the guide block.

Referring now more particularly to the accompanying drawings, the reference character 1 indicates an oven provided with a mouth 2, there being a table or other support indicated at 3.

The character 4 indicates an arm disposed adjacent to the oven and secured to the support 3 by means of suitable clamps 5. This arm 4 coöperates with an arm 6, said arms being connected in spaced relation at their outer ends by the spring 7, resulting in the arm 6 being yieldable with relation to its companion arm.

Secured in any suitable manner to one edge of the support 3 is a member 8 provided with a longitudinal groove 9, the outer end of which is closed by a filling member 10, which is removably held in place by a fastening 11 passed therethrough and also through the member 8 into the support 3. A rod 12 is secured in any suitable manner to said member 8 and has its body portion spaced therefrom to slidably receive the rings 13.

The characters 14 and 15 indicate rings secured at intervals to the arms 4 and 6, said rings being preferably in alinement with the aforesaid rings 13, the rings having a cord 16 threaded through them and also through the loops 17 in the edges of the canvas pocket 18 provided with the opening 19 which permits of the discharge of crumbs, etc., there being eyes 20 formed in the canvas 18 adjacent said opening to receive the lacing 21 which prevents bread, cake or other commodities, other than crumbs from falling through the opening.

As the baker takes bread or other commodities from the mouth of the oven to place the same on a nearby support or in a basket or to hand to another person he frequently drops loaves of bread, cake and the like, due to haste or carelessness. It is for this reason that I dispose my device, which is in a sense a collapsible, flexible tray, immediately beneath the mouth of the oven with the inner arm 4 rigid. If any of the commodities should fall, they would drop onto the canvas 18, and not break or become unsalable, the same being caught by the canvas, and not soiled by falling on the floor. As the outer arm 6 is some distance from the oven, I mount it yieldable with relation to its companion arm so that as the baker reaches into the mouth of the oven and his body contacts with the outer arm 6, the latter may move inwardly at one end so as to permit of easy access to the oven. This movement of the arm 6 is permitted by virtue of the spring 7 at the outer ends of the arms and by reason of the inner end of the arm 6 having slidable connection with the aforesaid member 8 by means of a suitable coupling which consists of a guide block 22 slidable freely in the aforesaid groove 9 of the member 8 and which carries an eye 23 freely slidable on the rod 24 secured at one end, as at 25 to the arm 6 and free to slide loosely through the eyes 26 secured to the arm 6 slightly above the rings 15 of the latter. Just as soon as the baker withdraws from the oven, the arm 6 is not under pressure, and by virtue of the spring 7, returns to its normal position. It will thus be seen that the guide block 22 has free sliding movement in the groove or guide 9 of the member 8 and that, therefore, the inner end of the arm 6 may freely move toward the arm 4 under pressure and that, by virtue of the spring 7, it may easily and freely return to its normal position when relieved of pressure. Should it become necessary to remove or replace the slide 22 it is only necessary to remove the fastening 11, permitting ready removal of the filling piece 10 and the insertion of the same or a substitute piece.

What I claim is:—

1. A device of the class described, comprising a supporting means, an arm fixedly secured to the supporting means, a rod on the supporting means, a second arm slidable at one end on said rod, a connection between the arms at their outer ends, and flexible material having connection at its edges with said arms and said rod.

2. A device of the class described, comprising a supporting means, an arm fixedly secured to the supporting means, a rod on the supporting means, a second arm slidable at one end on said rod, a yieldable connection between the arms at their outer ends, and flexible material having connection at its edges with said arms and said rod.

3. A device of the class described, comprising a supporting means, an arm fixedly secured to the supporting means, a rod on the supporting means, a second arm slidable at one end on said rod, a connection between the arms at their outer ends, and flexible material having connection at its edges with said arms and said rod, the flexible material having an opening.

4. A device of the class described, comprising a supporting means, an arm fixedly secured to the supporting means, a rod on the supporting means, a second arm slidable at one end on said rod, a connection between the arms at their outer ends, and flexible material having connection at its edges with said arms and said rod, the flexible material having an opening and lacing extending over said opening.

5. A device of the class described, comprising a supporting means, an arm fixedly secured to the supporting means, a rod on the supporting means, a second arm slidable at one end on said rod, a yieldable connection between the arms at their outer ends, and flexible material having connection at its edges with said arms and said rod, the flexible material having an opening.

6. A device of the class described, comprising a supporting means, an arm fixedly secured to the supporting means, a rod on the supporting means, a second arm slidable at one end on said rod, a yieldable connection between the arms at their outer ends, and flexible material having connection at its edges with said arms and said rod, the flexible material having an opening and means to restrict the passage through said opening.

7. A device of the class described, comprising a supporting means, a member secured to the supporting means provided with a slot, an arm secured to the supporting means, a guide block mounted in the slot of the aforesaid member, a second arm having connection with said guide block, a spring connection between said arms, and flexible material having connection with said arms.

8. A device of the character described comprising a supporting means, a slotted member secured to said supporting means, a guide block slidable in the slot of said slotted member, means whereby the guide block may be removed from said slot, an arm having connection with the supporting means, an arm having connection with the guide block, a connection between said arms, and flexible material having connection with said arms.

9. A bread and roll catching device comprising a pair of arms, a yieldable member connecting the arms whereby one arm may move toward and away from the other arm, and flexible material having connection with said arms.

10. A bread and roll catching device comprising a pair of members, one member movable toward the other, a rod for coöperation with said members, and flexible material having connection with said members and said rod.

In testimony whereof I affix my signature in presence of witnesses.

GEORGE MUELLER.

Witnesses:
N. G. HALL,
W. A. WIGHT,
J. DUMMER.